United States Patent [19]  [11] 4,114,857
Bondi  [45] Sep. 19, 1978

[54] SPOOL TYPE METERING VALVE

[75] Inventor: Pasquale Columbo Bondi, Revere, Mass.

[73] Assignee: General Electric Company, Lynn, Mass.

[21] Appl. No.: 736,481

[22] Filed: Oct. 28, 1976

[51] Int. Cl.² ............................................. F16K 3/26
[52] U.S. Cl. ................................. 251/324; 137/501
[58] Field of Search ............. 137/501, 503; 251/324; 73/420

[56] References Cited

U.S. PATENT DOCUMENTS

| 39,485 | 8/1863 | Lecky | 137/625.69 |
|---|---|---|---|
| 41,035 | 12/1863 | Ball | 137/625.69 |
| 3,443,594 | 5/1969 | Frayer | 137/625.64 |
| 3,589,401 | 6/1971 | Harding | 137/625.64 |

FOREIGN PATENT DOCUMENTS 1,109,424  4/1968  United Kingdom ................ 137/501

Primary Examiner—Arnold Rosenthal
Attorney, Agent, or Firm—Derek P. Lawrence; Henry J. Policinski

[57] ABSTRACT

In a flow metering valve of the type in which flow through the outlet ports is regulated as a function of spool displacement and the measured pressure difference across the outlet port, valve accuracy is greatly improved by providing a ducted chamber through the valve casing to communicate with the valve interior such that upstream pressure at the outlet is measured internal to the valve. This arrangement prevents the hydraulic losses associated with the internals of the valve from generating erroneous pressure measurements.

2 Claims, 4 Drawing Figures

SPOOL TYPE METERING VALVE

BACKGROUND OF THE INVENTION

The present invention relates to improvements in spool type metering valves and more particularly to a spool type metering valve which is constructed such that the hydraulic losses associated with the entrance to the inlet port and the interior construction of the valve do not affect pressure readings extracted from the valve and therefore have no effect on the flow schedule produced by the valve.

Metering valves have been used throughout industry for a wide variety of purposes. Such valves generally include inlet and outlet ports for metering fluid flow therebetween. These valves have a variety of applications in which the rate of fluid flow is caused to vary as a function of a mechanical device. One such valve which is widely used includes a casing having a valve bore therein and includes axially spaced inlet and outlet ports. Disposed in the valve bore is a rotatable spool having circumferentially relieved areas which cooperate with the valve housing to define an axially restricted flow path between the inlet and outlet ports. The valve spool includes a land portion adjacent the outlet port having a cross-sectional area slightly greater than the cross-sectional area of the outlet port such that rotation of the valve spool and/or axial displacement of the spool within the bore varies the outlet area and thereby regulates the amount of fuel flowing from the outlet port. Such valves have a wide variety of applications and typically may be used to regulate fuel flow in a manner in which fuel flow varies linearly with spool position. For this purpose prior art valves of this type generally include transducers for measuring the pressure across the valve outlet port. These pressure readings are used to modulate a pressure regulating valve in the fluid medium supplying the metering valve such that the pressure difference across the metering valve outlet port is maintained constant thereby enabling the flow through the metering valve to be varied linearly with spool displacement. The relationship between fluid flow rate and the outlet port cross-sectional area may be represented mathematically as $$Q = KA\sqrt{\Delta P}$$

Where:
$Q$ = fuel flow
$K$ = constant depending on valve geometry
$A$ = area of the outlet port
66 $P$ = pressure across the outlet port
by maintaining $\Delta P$ constant, it can be seen from the above equation that the fuel flow Q will vary linearly as a function of the area A of the outlet port, which varies linearly as a function of spool displacement.

FIG. 1 illustrates a typical prior art valve of this type. The pressure across the outlet port 4 of the prior art metering valve 2 is generally extracted from the annuli 6 and 8 that surround the inlet and exit ports 3 and 4 respectively. Such prior art valves have demonstrated unsatisfactory performance particularly at relatively large fuel flow rates where such prior art valves generate excessive flow errors. These errors are a result of the hydraulic losses at the inlet and internal to the valve which depress the pressure between the inlet and outlet area thereby producing an error between the actual differential pressure across the outlet port and the sensed differential pressure. The hydraulic losses tend to disrupt the ability of the valve spool to produce a desired flow schedule versus spool displacement. This phenomena is particularly acute when the valve is used to meter large flow rates. As flow through the valve is increased, the internal losses become more significant and cause the flow schedule to drop significantly below the desired linear flow schedule. This phenomenon is illustrated in the graph of FIG. 3.

OBJECT OF THE INVENTION

It is therefore the primary object of the present invention to provide apparatus for extracting the upstream pressure of the outlet of a spool type metering valve internal to the valve such that the hydraulic losses at the valve inlet and internal to the valve have negligible effect on the flow schedule produced by the valve.

It is a further object of this invention to provide apparatus for extracting the pressure from a spool type metering valve such that the hydraulic losses associated with the valve entrance and interior of the valve appear as pumping losses rather than having an effect of the flow schedule produced by the valve.

SUMMARY OF THE INVENTION

These and other objects are achieved in the preferred embodiment of this invention in which a flow metering valve is provided which includes a casing having a valve bore therein and axially spaced inlet and outlet ports. Axially disposed in the bore is a spool having circumferentially relieved areas which cooperate with the internal walls of the casing to define an axially restricted flow path between the inlet and outlet ports. The valve spool includes a land area adjacent to the outlet port having a cross-sectional area slightly greater than the cross-sectional area of the outlet such that axial motion of the spool within the bore varies the exit area of the outlet port and thereby regulates the rate of flow through the valve. The valve depicted in FIG. 1 is adapted to regulate fluid flow in response to axial displacement of spool. However, it is known in the art to provide for regulation of fluid flow in accordance with rotational displacement of the spool either alone or in combination with axial displacement. Use of either of these approaches is dependent upon system requirements. In order to prevent internal losses of the valve from interferring with a measured pressure difference across the outlet port, a ducted chamber or tube is provided through the valve casing which communicates with the valve interior in proximity to the upstream side of the outlet port in such a position as not to be obtruded by the land portion of the valve spool. The other end of the ducted chamber is located in a cavity concentric to the valve casing from which pressure readings may be taken. Because the upstream pressure across the outlet port is measured internal to the valve rather than at the inlet port, the hydraulic losses associated with the internals of the valve appear as pumping losses and do not affect the flow schedule produced by the valve.

Valves constructed in this manner permit the pressure across the outlet port to be measured extremely accurately, and thereby permit the fluid flow to the valve to be accurately modulated to produce a constant pressure drop across the outlet port even at relatively large fluid flow rates. This in turn permits the metering valve to maintain a linear flow rate versus spool displacement even for relatively large fluid flow rates.

BRIEF DESCRIPTION OF THE DRAWINGS

The invention will be more clearly understood upon reading the following detailed description of the preferred embodiment in conjunction with the accompanying drawings all of which are intended to be representative rather than in any way limiting on the scope of the invention wherein.

DESCRIPTION OF THE PREFERRED EMBODIMENT

Figure 1:
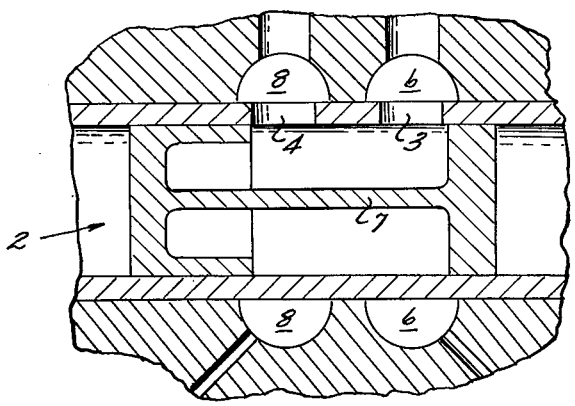
FIG. 1 shows a cross-sectional view of a prior art spool type metering valve.

Referring to FIG. 1 therein is shown a prior art metering valve 2. The valve includes inlet and outlet ports 3 and 4 respectively surrounded by respective cavities 6 and 8 from which pressure measurements are taken to regulate fluid flow to the inlet port 3 so as to maintain a constant pressure difference across the outlet port 8 and thereby produce a linear schedule of fluid flow through the valve as a function of the axial position of the valve spool 7. However because of losses at the inlet entrance and internal losses the measured pressure difference between the cavities 6 and 8 does not correspond to the pressure across the outlet area 4. These losses become more significant as fluid flow through the valve increases resulting in a relatively large error in the desired linear flow schedule produced by the valve. This phenomenon is illustrated in the graph of fluid flow through the valve 3 as a function of the position of the valve spool 7. As can be seen from FIG. 3 the flow schedule produced by the valve 2 becomes significantly non-linear as fluid flow therethrough increases.

Figure 2:
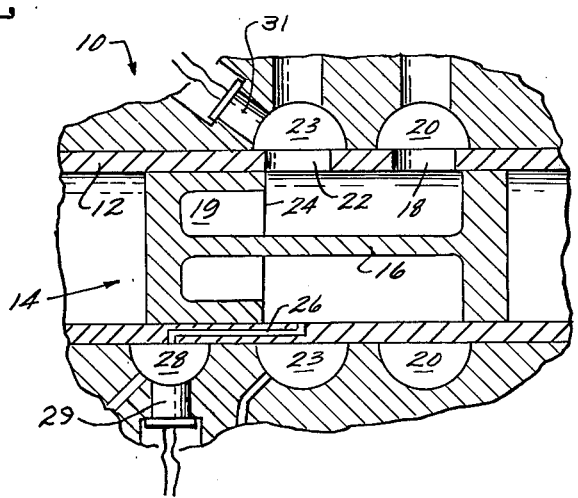
FIG. 2 shows a cross-sectional view of a spool type metering valve constructed in accordance with the teachings of this invention.

Referring to FIG. 2, therein is shown a spool type metering valve 10 having a valve housing 11 carrying a cylindrical outer casing 12 with a bore 14 rotatably disposed therein. Disposed through the casing 12 is an inlet port 18 surrounded by a flow annulus 20 which is in flow communication with a fluid medium. Also disposed through the casing 12 is an outlet port 22 axially spaced from the inlet port 18 and surrounded by a flow annulus 23.

The valve spool 16 includes relieved portions shown generally at 19 which cooperate with the internal walls of the valve bore 14 to define an axially restricted flow path between the inlet port 18 and outlet port 22. The valve spool 16 also includes an elongated land portion 24 of sufficient cross-sectional area to completely cover the outlet port 22 at a predetermined axial position of the spool 16 within the bore 14 and to progressively place a larger cross-sectional area of the outlet port 22 in flow communication with the axially restricted flow path as the spool 16 is moved axially. As previously mentioned it is known in the prior art that fluid flow may be regulated in accordance with either axial or rotational displacement of a spool member or a combination of both. The present invention is equally adapted to be compatible with any of these valves but for purposes of this description the present invention is, as will become apparent, shown associated with a valve which regulates flow in accordance with axial displacement of the spool 16. In this manner, flow through the outlet port 22 may be varied by motion of the valve spool 16 within the bore 14. In order that the rate of flow between the inlet port 18 and outlet port 22 may vary linearly with the axial displacement of the spool 16, a pressure regulating valve (not shown), is disposed within the fluid medium supplying the flow annulus 20. This valve regulates the pressure level at the inlet port 18 so as to maintain a constant pressure drop across the outlet port 22.

In accordance with this invention in order to prevent the pressure losses of the valve 10 from interferring with the pressure signals supplied to the pressure regulating valve, a ducted chamber or tube 26 is provided through the valve casing 12. The inlet to the tube 26 is disposed in flow communication with the bore 14 in a position as not bo be restricted by the spool land 24 in any operational position thereof. The other end of the tube 26 may be placed in flow communication with a suitable annulus 28 formed integral with the valve housing 11 to provide a cavity from which pressure signals may be extracted to operate the pressure regulating valve (not shown). Thus, the pressure drop across the outlet port 22 may be measured by suitable pressure transducers 29 and 31 placed in the flow annulus 23 and 28. Since the annulus 28 is in direct communication with the valve bore 14 by means of the tube 26, the hydraulic losses caused by the various bends and turns in the internals of the valve between the inlet port 18 and the outlet port 22 do not affect the pressure readings taken from the flow annulus 28 and therefore do not cause erroneous pressure signals to be transmitted to the pressure regulating valve. Such losses are particularly significant at high flow rates.

Figure 3:
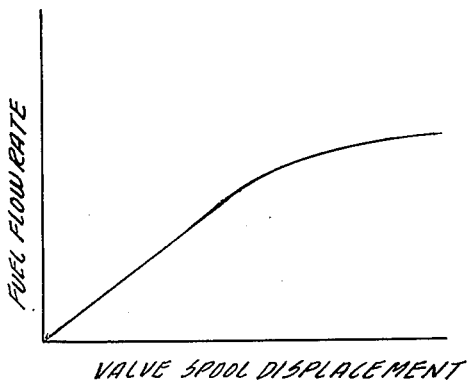
FIG. 3 is a graph of fuel flow rate versus spool displacement for a prior art metering valve.
Figure 4:
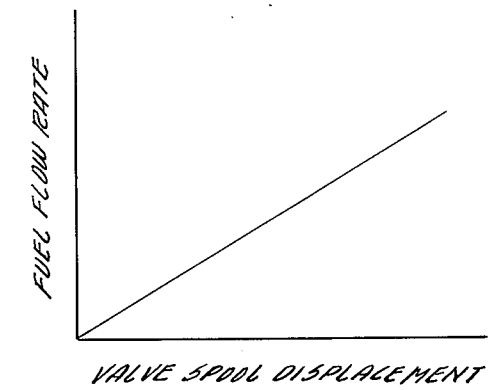
FIG. 4 is a graph of fuel flow rate versus spool displacement for a metering valve constructed in accordance with the teachings of this invention.

Referring to FIG. 4 therein is shown a graph of fuel flow rate versus valve spool displacement for a valve of identical geometry as the valve producing the graph of FIG. 3 with the exception that the valve casing includes tube 26 between the bore 14 and a flow annulus 28 in accordance with the teachings of this invention, such that signals for regulating the pressure of a pressure regulating valve are taken from the annulus 23 surrounding the outlet port and the annulus 28 surrounding the tube 26. As can be seen by comparing the graphs of FIGS. 3 and 4, valves constructed in accordance with the teachings of the present invention provide significantly better linear flow regulation at relatively high flow rates. This is because the pressure losses associated with the inlet and internals of the valve appear as pumping losses and do not affect the pressure signal which is extracted internal to the valve.

Accordingly, while a preferred embodiment in a preferred application of the present invention has been depicted and described, it will be appreciated by those skilled in the art that many modifications, substitutions and changes may be made thereto without departing from the fundamental theme of this invention Thus, having described a preferred embodiment of the invention, though not exhaustive of all possible equivalents, what is desired to be secured by Letters Patent is claimed below.

What is claimed is:

1. In combination with a metering valve of the type comprising a hollow cylindrical casing disposed within a valve housing, said casing including an axially extending bore and axially spaced apart fluid inlet and outlet ports disposed in said casing in fluid communication with each other through said bore, a spool disposed in said base and having circumferentially relieved areas cooperating with said bore to define therewith an axially restricted flow path between said inlet and outlet ports, said spool including a land area adapted to overlap at least a portion of said outlet port so as to restrict the flow of fluid through said outlet port, the improvement comprising:

a tube extending through said casing, one end of said tube in fluid communication with said axially restricted flow path at a point immediately upstream of said outlet port and the other end thereof said tube disposed at a point external to the casing;

a first cavity surrounding said other end of said tube and formed integrally with said housing, said cavity providing a first annulus from which the internal pressure at said point immediately upstream of said outlet port may be measured;

a second cavity surrounding said outlet port at a point immediately downstream of said outlet port to provide a second annulus from which the pressure at said point immediately downstream of said outlet port may be measured;

a first pressure transducer operatively connected to said first annulus for measuring the pressure at said upstream point; and a second pressure transducer operatively connected to said second annulus for measuring the pressure at said downstream point.

2. A system for metering fluid flow comprising:

a metering valve including a casing disposed within a valve housing and having a bore therein, axially spaced inlet and outlet ports therethrough, said inlet and outlet ports surrounded by respective cavities, a spool disposed in the bore having circumferentially relieved areas which cooperate with the interior walls of the casing to define an axially restricted flow path between the inlet and outlet ports, said spool including a land area for varying the exit area of the axially restricted flow path to thereby regulate fluid flow through the valve and a tube disposed through the casing having one end in flow communication with the axially restricted flow path in proximity to the outlet port and the other surrounded by a cavity formed integral with the valve housing whereby the upstream pressure at the oulet port may be measured internal to the valve.

* * * * *